(12) United States Patent  (10) Patent No.: US 9,124,821 B2
Nishiyama  (45) Date of Patent: Sep. 1, 2015

(54) COMMUNICATION APPARATUS AND COMMUNICATION METHOD

(71) Applicant: KYOCERA Document Solutions Inc., Osaka (JP)

(72) Inventor: Masahiro Nishiyama, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/565,198

(22) Filed: Dec. 9, 2014

(65) Prior Publication Data

US 2015/0172506 A1  Jun. 18, 2015

(30) Foreign Application Priority Data

Dec. 18, 2013 (JP) .................................. 2013-261174

(51) Int. Cl.
*G06K 15/00* (2006.01)
*H04N 1/32* (2006.01)
*H04N 1/00* (2006.01)

(52) U.S. Cl.
CPC ....... *H04N 1/32619* (2013.01); *H04N 1/00347* (2013.01); *H04N 1/32614* (2013.01); *H04N 1/32625* (2013.01); *H04N 1/32662* (2013.01); *H04N 2201/0094* (2013.01)

(58) Field of Classification Search
None
See application file for complete search history.

(56) References Cited

U.S. PATENT DOCUMENTS

| 7,894,091 B2* | 2/2011 | Fujino | 358/1.15 |
| 8,958,098 B2* | 2/2015 | Sato | 358/1.15 |
| 2006/0190560 A1* | 8/2006 | Komine | 709/217 |
| 2007/0115978 A1* | 5/2007 | Kondo | 370/392 |
| 2011/0307541 A1* | 12/2011 | Walsh et al. | 709/203 |
| 2013/0120781 A1* | 5/2013 | Iwashima | 358/1.13 |
| 2013/0215456 A1* | 8/2013 | Saitoh | 358/1.15 |

FOREIGN PATENT DOCUMENTS

| JP | 2005-236438 A | 9/2005 |
| JP | 2013-031019 A | 2/2013 |

* cited by examiner

*Primary Examiner* — Miya J Cato (57) ABSTRACT

A communication apparatus includes a communication control section and an information acquiring communication control section. When the communication apparatus serving as a destination causes an error requiring repair, the destination communication apparatus determines a processing executable time from an estimated repair period indicated by a maintenance notice acquired by issuing to a maintenance system a maintenance call requesting the repair and sends back to the communication apparatus serving as a source having made a connection request temporal inexecutability information indicating that the destination communication apparatus is temporarily unable to execute a connection processing required by the connection request and containing the processing executable time when the destination communication apparatus becomes able to execute the connection processing.

6 Claims, 7 Drawing Sheets

Fig.5

COMMUNICATION APPARATUS AND COMMUNICATION METHOD

INCORPORATION BY REFERENCE

This application claims priority to Japanese Patent Application No. 2013-261174 filed on Dec. 18, 2013, the entire contents of which are incorporated by reference herein.

BACKGROUND

The present disclosure relates to communication apparatuses and particularly relates to a technique in which when a destination communication apparatus causes an error requiring repair, the destination communication apparatus notifies a source communication apparatus of temporal inexecutability information.

For example, there is proposed, as a technique for data transmission using communication based on SIP (Session Initiation Protocol), a technique A in which if a data storage section, such as a memory, of a destination facsimile apparatus (an example of a communication apparatus) is short of available space when a source facsimile apparatus transmits transmission target data to the destination facsimile apparatus, the destination facsimile apparatus transmits to the source facsimile apparatus information indicating the shortage of available space and information indicating the time when it will be able to receive the data and the source facsimile apparatus then transmits the transmission target data with the advent of the time when the destination facsimile apparatus becomes able to receive the data.

There is also proposed a technique B in which when a source facsimile apparatus receives from a destination facsimile apparatus temporal inexecutability information indicating that the destination facsimile apparatus is temporarily unable to execute the connection processing required by a connection request from the source facsimile apparatus and containing a processing executable time when the destination facsimile apparatus will be able to execute the connection processing, the source facsimile apparatus disconnects communication for the connection request, postpones the retransmission of the connection request to the destination until the end of a waiting period based on the temporal inexecutability information, and, upon receipt of a state update indicating that the connection processing has become executable from the destination during the postponement of retransmission of the connection request for the waiting period, retransmits the connection request to the destination even before the end of the waiting period.

SUMMARY

A technique improved over the above techniques is proposed as one aspect of the present disclosure.

A communication apparatus according to an aspect of the present disclosure includes a communication control section and an information acquiring communication control section.

The communication control section is configured to respond to, based on SIP (Session Initiation Protocol), a request from a source communication apparatus.

The information acquiring communication control section is configured to control communication with an external maintenance system.

The communication control section is further configured to, when the associated communication apparatus including the communication control section itself receives a connection request as the request from the source communication apparatus but is temporarily unable to execute connection processing required by the connection request, respond to the connection request to send back to the source communication apparatus temporal inexecutability information indicating that the associated communication apparatus is temporarily unable to execute the connection processing required by the connection request and containing a processing executable time when the associated communication apparatus becomes able to execute the connection processing.

The information acquiring communication control section is further configured to, when the associated communication apparatus including the information acquiring communication control section itself causes an error requiring repair, issue to the maintenance system a maintenance call requesting the repair and determine the processing executable time based on an estimated repair period indicated by a maintenance notice which is a response to the maintenance call.

A communication method according to another aspect of the present disclosure includes a replying step and a processing executable time determining step.

The replying step is the step of, when an associated communication apparatus receives a connection request as a request from a source communication apparatus but is temporarily unable to execute connection processing required by the connection request, responding to the connection request based on SIP (Session Initiation Protocol) to send back to the source communication apparatus temporal inexecutability information indicating that the associated communication apparatus is temporarily unable to execute the connection processing required by the connection request and containing a processing executable time when the associated communication apparatus becomes able to execute the connection processing.

The processing executable time determining step is the step of, when the associated communication apparatus causes an error requiring repair, issuing to an external maintenance system a maintenance call requesting the repair and then determining the processing executable time based on an estimated repair period indicated by a maintenance notice which is a response to the maintenance call.

DETAILED DESCRIPTION

Figure 1:
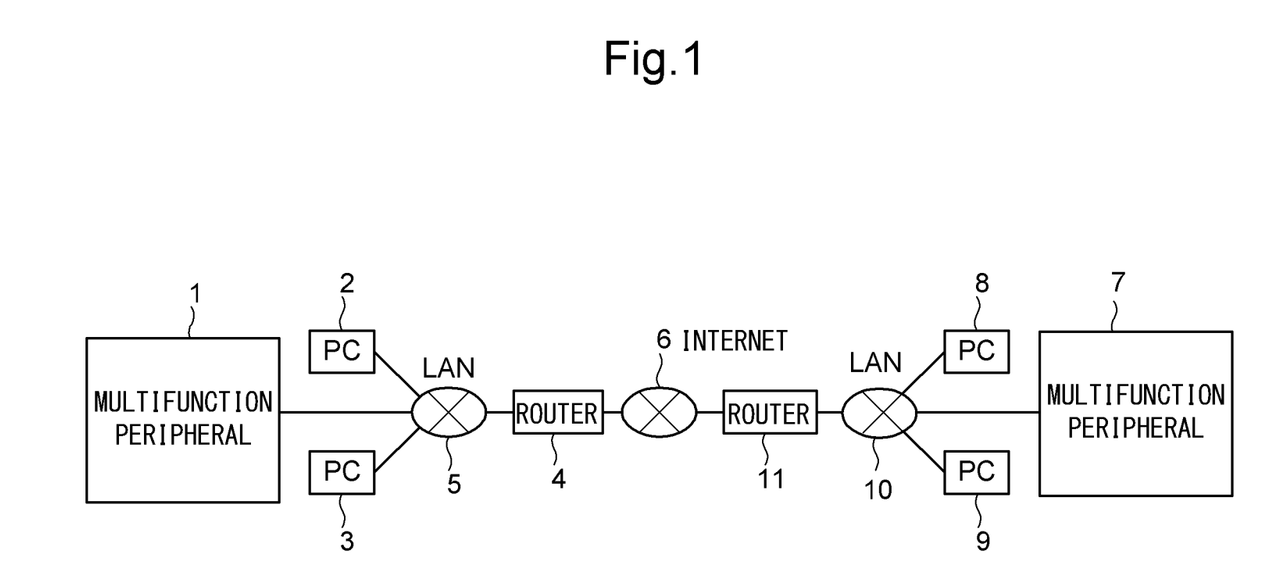
FIG. 1 is a diagram showing a network architecture when network communication is performed using a facsimile apparatus which is one embodiment of a communication apparatus according to the present disclosure.

Hereinafter, a description will be given of a communication apparatus and a communication method, both according to one embodiment of the present disclosure, with reference to the drawings. FIG. 1 is a diagram showing a network architecture when network communication is performed using a facsimile apparatus which is one embodiment of the communication apparatus according to the present disclosure.

This embodiment will be described in terms of an example in which a multifunction peripheral 7 is applied as a facsimile apparatus which is one embodiment of the communication apparatus according to the present disclosure (a destination facsimile apparatus in this embodiment) and a multifunction peripheral 1 is applied as a source facsimile apparatus. The multifunction peripheral 1 has a copy function, a facsimile function, a scan function, and a print function. The multifunction peripheral 1 has a facsimile function based on SIP (Session Initiation Protocol). For example, the multifunction peripheral 1 has a call control function based on SIP and a facsimile function over an IP-based network conforming to T.38 Recommendations and these functions are hereinafter referred to collectively as a SIP-based facsimile function. This embodiment will be described taking as an example the multifunction peripheral 1 having, in addition to the SIP-based facsimile function, a facsimile communication function over a public telephone network.

The multifunction peripheral 1 is located, for example, in a business office or the like and network-connected via a LAN (local area network) 5 to an arbitrary number of personal computers (hereinafter, referred to as PCs) 2, 3. The multifunction peripheral 1 and the PCs 2, 3, over the LAN 5, can recognize each other using IP addresses and transfer data to and from each other. The LAN 5 is connected via a router 4 to the Internet 6.

The aforementioned SIP-based facsimile function of the multifunction peripheral 1 is configured to be implementable by, as described above, for example, communication conforming to T.38 Recommendations.

The destination to which the multifunction peripheral 1 transmits transmission target data by facsimile transmission using the above SIP-based facsimile function (hereinafter, referred to simply as facsimile transmission), i.e., the destination receiving the transmission target data, is also a communication apparatus, such as a facsimile apparatus or a multifunction peripheral, having the SIP-based facsimile function. In this embodiment, the destination apparatus is described as the multifunction peripheral 7. Like the multifunction peripheral 1, this multifunction peripheral 7 is, in an environment where it is located, connected via a LAN 10 or the like to an arbitrary number of PCs 8, 9 to allow data transfer from and to them. Furthermore, the LAN 10 is connected via a router 11 to the Internet 6 and can transfer data via the Internet 6 to and from the multifunction peripheral 1 which is the source of the transmission target data.

Figure 2:
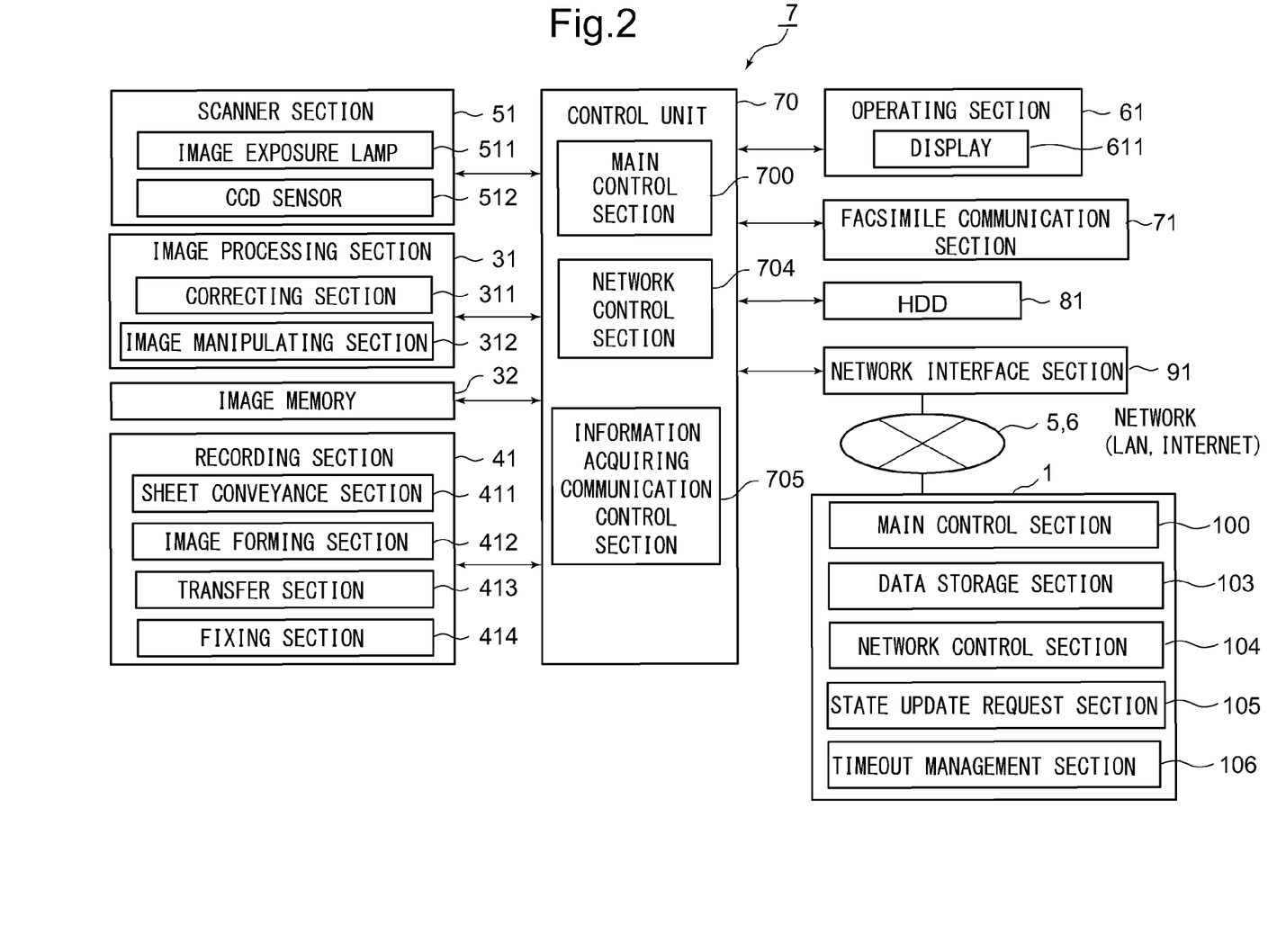
FIG. 2 is a functional block diagram schematically showing an essential internal configuration of a multifunction peripheral.

Next, a description will be given of the configuration of the multifunction peripheral 7. FIG. 2 is a functional block diagram schematically showing an essential internal configuration of the multifunction peripheral 7.

The multifunction peripheral 7 includes a control unit 70. The control unit 70 is composed of a CPU (central processing unit), a RAM, a ROM, a dedicated hardware circuit, and so on and governs the overall operation control of the multifunction peripheral 7.

The control unit 70 is connected to a scanner section 51, an image processing section 31, an image memory 32, a recording section 41, an operating section 61, a facsimile communication section 71, an HDD (hard disk drive) 81, and a network interface section 91.

The control unit 70 includes a main control section 700 governing the aforementioned overall operation control of the multifunction peripheral 7. The main control section 700 controls the driving and processing of each of the above mechanical sections necessary to perform the operation control of the scan function, the print function, the copy function, and the facsimile function.

The scanner section 51 includes an image exposure lamp 511 and a CCD (charge coupled device) sensor 512 which constitute an unshown scanner. The scanner section 51 is configured to read an image from an original document by applying light to the original document with the image exposure lamp 511 and receiving, at the CCD sensor 512, reflected light from the original document.

The image processing section 31 includes a correcting section 311 and an image manipulating section 312. The image processing section 31 is configured to, as needed, process image data read by the scanner section 51 with its correcting section 311 and image manipulating section 312. The image data processed by the image processing section 31 is stored in the image memory 32 or output to the recording section 41 or the facsimile communication section 71. The correcting section 311 is configured to subject the image data read by the scanner section 51 to predetermined correction processing, such as level correction or gamma correction. The image manipulating section 312 is configured to perform various types of manipulations of image data, including compression/expansion and enlargement/reduction. The image memory 32 stores, in addition to the aforementioned image data, incoming data received, for example, by a network control section 704 through communication using the SIP-based facsimile function.

The recording section 41 includes: a sheet conveyance section 411 composed of unshown sheet feed cassettes, sheet feed rollers, and so on; an image forming section 412 composed of an unshown photosensitive drum, an unshown exposure device, an unshown developing device, and so on; a transfer section 413 composed of an unshown transfer roller and so on; and a fixing section 414 composed of an unshown fixing roller and so on. The recording section 41 functions to print on a recording paper sheet an image based on image data to be printed. Examples of image data to be printed by the recording section 41 include image data read by the scanner section 51, image data transmitted via the LAN 10 and the network interface 91 from the PCs 8, 9 and the like, and image data transmitted via the Internet 6, the LAN 10, and the network interface 91 from the external multifunction peripheral 1, external PCs 2, 3, and the like. Specifically, the sheet conveyance section 411 conveys a recording paper sheet to the image forming section 412, the image forming section 412 forms a toner image corresponding to the above image data, the transfer section 413 transfers the toner image to the recording paper sheet, and the fixing section 414 fixes the toner image on the recording paper sheet. In this manner, image formation of the recording section 41 onto the recording paper sheet is implemented.

The operating section 61 includes a touch panel section and an operating key section which are configured to receive operator's commands for various types of operations and processing executable by the multifunction peripheral 7. The touch panel section includes a display 611 formed of an LCD (liquid crystal display) or the like equipped with a touch panel. The touch panel section and the operating key section receive from the operator, for example, a command to specify a job to be executed. The command received by the operating section 61 is sent to the main control section 700 and the main control section 700 controls various operations and processing of the multifunction peripheral 7 according to the command.

The facsimile communication section 71 includes a coding/decoding section, a modulation/demodulation section, and an NCU (network control unit), all of which are not illustrated, and is configured to perform facsimile communication using a public telephone network. More specifically, the facsimile communication section 71 is configured to transmit via the telephone network to a facsimile apparatus or the like, for example, image data of an original document read by the scanner section 51 and receive via the telephone network image data transmitted from a facsimile apparatus or the like.

The HDD (hard disk drive) 81 is configured to store various types of data, such as image data read by the scanner section 51 and an output format set for the image data. The image data stored on the HDD 81 is used by the multifunction peripheral 7 and for various programs adopted by the multifunction peripheral 7.

The network interface section 91 is constituted by a communication module, such as a LAN board, and configured to transfer various data to and from external apparatuses (the multifunction peripheral 1, the PCs 2, 3, and so on) via the LAN 10 or the like connected to the network interface section 91. In this embodiment, the network interface section 91 is compatible with a protocol for facsimile communication using the aforementioned SIP-based facsimile function.

In this embodiment, the multifunction peripheral 1 serving as a source includes, for example, a main control section 100, a data storage section 103, a network control section 104, a state update request section 105, and a timeout management section 106.

The data storage section 103 is formed of a memory, an HDD or the like and configured to temporarily store transmission target data to be faxed to the multifunction peripheral 7.

The network control section 104 handles the control for SIP-based network communication. For example, the network control section 104 is configured to make a request, such as a connection request, to a destination, respond to a response sent back from the destination, and respond to a request from the destination. After establishing a connection with the destination having accepted the above connection request, the network control section 104 transmits transmission target data formed of document data read by an unshown scanner section, which is similar to the scanner section 51 of the multifunction peripheral 7, through a network interface section, which is similar to the network interface section 91 of the multifunction peripheral 7, via networks, such as the LAN 5, the Internet 6, and the like, to a destination indicated by destination information (information indicating a destination for facsimile transmission) entered by an operator through an unshown operating section, which is similar to the operating section 61 of the multifunction peripheral 7, using the facsimile function over the IP-based network using an SIP-based call control function.

Furthermore, the network control section 104 is configured to encode and decode, based on a predetermined coding system for use in the aforementioned SIP-based communication (facsimile communication in this embodiment), the above transmission target data acquired by the unshown scanner section or the like. The network control section 104 and the unshown network interface section may, in the above manner, transmit to the destination, as the above transmission target data, image data (of any data type on condition of having a data format capable of expressing images) received via the network from the PC 2, 3 or the like.

The state update request section 105 is configured to, when the content of the response of the multifunction peripheral 7 as a destination to the connection request, which has been transmitted as a request to the multifunction peripheral 7 by the network control section 104 and the unshown network interface section, is temporal inexecutability information indicating that the multifunction peripheral 7 is temporarily unable to execute connection processing required by the connection request and containing a processing executable time when the multifunction peripheral 7 becomes able to execute the connection processing, request to notify the source multifunction peripheral 1 of a state update indicating a change of state of the multifunction peripheral 7 serving as the destination. For example, when the response of the destination multifunction peripheral 7 to the connection request is Retry-After 3600 (a signal instructing to make the request again after a specified period (3600 seconds in this example)), the state update request section 105 requests a presence server PS (see FIG. 5) to notify the source multifunction peripheral 1 of a state update indicating a change of state of the multifunction peripheral 7 serving as the destination.

In the destination multifunction peripheral 7, its main control section 700 detects a change of state of the multifunction peripheral 7. Then, each time the main control section 700 detects a change of state of the multifunction peripheral 7, the network control section 704 transmits to the presence server PS, as a state update, information indicating a state of the multifunction peripheral 7 after being changed.

The presence server PS is a server configured to acquire and store a state update from each communication apparatus connected thereto via a network and put under control thereof and notify each communication apparatus (such as a facsimile apparatus) of the state update as requested by the communication apparatus. When the presence server PS receives a state update transmitted from each communication apparatus being subject to its communication control, it stores the state update in its own data storage section, such as a memory or an HDD. When the presence server PS receives, from each communication apparatus being subject to its communication control, a transmission request to transmit a state update, the presence server PS transmits, to the communication apparatus having transmitted the transmission request, the state update of the communication apparatus required to be transmitted by the transmission request.

The timeout management section 106 is configured to set a timeout period (waiting period) based on information indicating a processing executable time, contained in the above temporal inexecutability information sent from the destination and received by the network control section 104. For example, if the response of the destination multifunction peripheral 7 to the connection request is Retry-After 3600 which indicates that the processing executable time is 3600 seconds after the sending of the response, the timeout management section 106 sets 3600 seconds as the timeout period. When this timeout period has passed, the network control section 104 makes control to transmit the connection request again to the destination currently unable to execute connection processing for the connection request.

In the multifunction peripheral 7 serving as the destination in this embodiment (an example of the communication apparatus described in What is claimed is), the control unit 700 further includes a network control section 704 and an information acquiring communication control section 705.

The network control section 704 is configured to, like the network control section 104 of the multifunction peripheral 1, control data communication through the network interface section 91 over networks, such as the LAN 10 and the Internet 6. For example, when a connection request is transmitted as a request from the multifunction peripheral 1 to the multifunction peripheral 7 but the multifunction peripheral 7 is temporarily unable to execute connection processing required by the connection request, the network control section 704 responds to the connection request from the multifunction peripheral 1 to send back to the multifunction peripheral 1 temporal inexecutability information indicating that the multifunction peripheral 7 is temporarily unable to execute the connection processing required by the connection request and containing a processing executable time when the multifunction peripheral 7 becomes able to execute the connection processing. For example, the network control section 704 sends back to the multifunction peripheral 1 a Retry-After 3600 response (a signal instructing to make the request again after a specified period (3600 seconds in this example)) or the like as the processing executable time.

Figure 4:
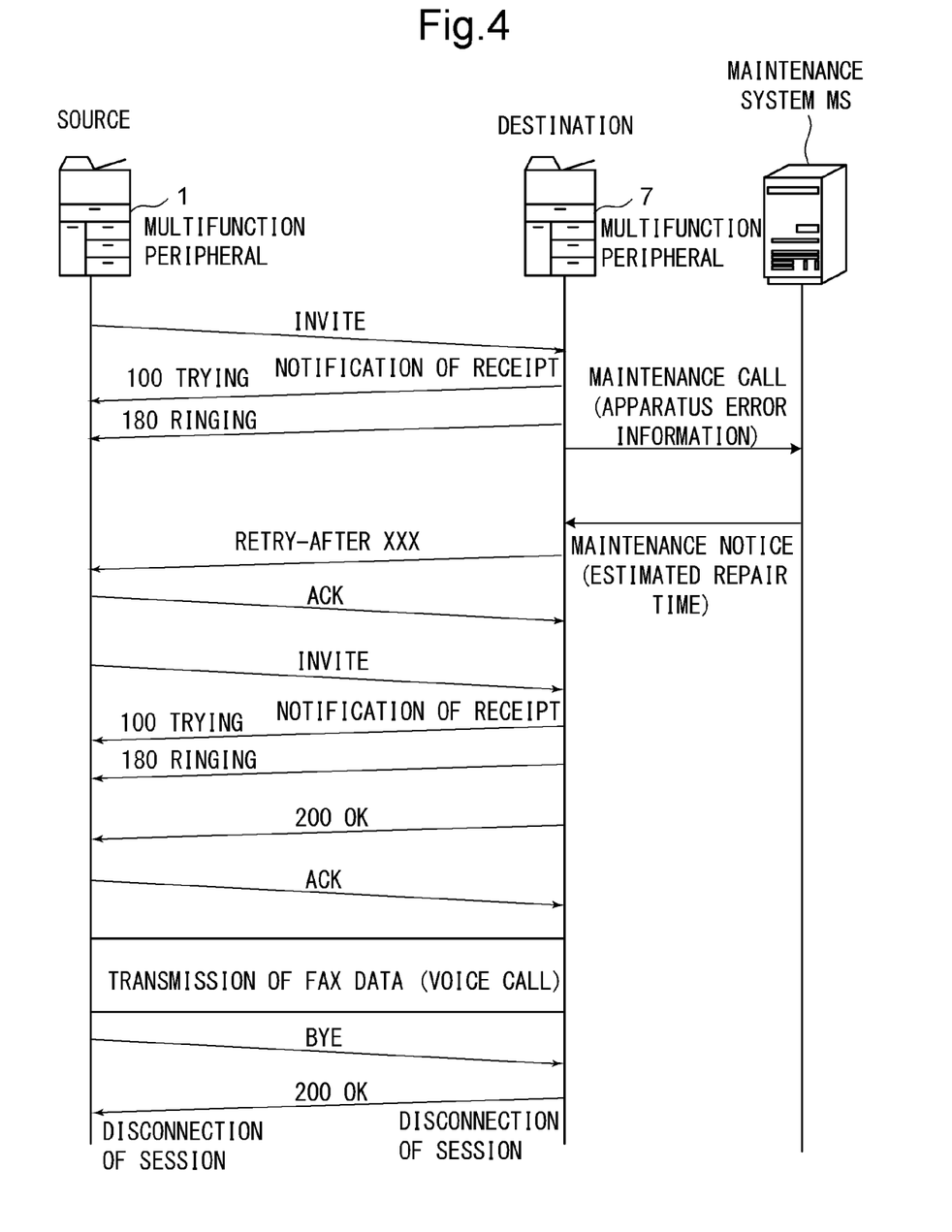
FIG. 4 is a chart showing another communication procedure during facsimile communication between the source multifunction peripheral and the destination multifunction peripheral.

The information acquiring communication control section 705 is configured to control communication with a maintenance system MS (see FIG. 4). When the multifunction peripheral 7 causes an error requiring repair, its information acquiring communication control section 705 issues a maintenance call to the external maintenance system MS (see FIG. 4).

The maintenance system MS is, for example, a server placed in a facility of a company contracting maintenance service for the multifunction peripheral 7. If an apparatus subject to maintenance (the multifunction peripheral 7 in this embodiment) causes an error requiring repair, the information acquiring communication control section 705 of the apparatus (multifunction peripheral 7) transmits a maintenance call to the maintenance system MS. The maintenance call contains details of the error (apparatus error information). The maintenance system MS determines repair content associated with the details of the error (apparatus error information). Then, the maintenance system MS notifies the apparatus subject to maintenance (multifunction peripheral 7) having transmitted the maintenance call of an estimated repair time (or an estimated repair period) necessary for the determined repair content, for example, an estimated time of arrival of a maintenance staff or a period of time taken to complete repair since the current point in time (maintenance notice).

In the multifunction peripheral 7, upon receipt of the maintenance notice, the information acquiring communication control section 705 determines the aforementioned processing executable time based on the estimated repair time indicated by the maintenance notice. When the information acquiring communication control section 705 determines the processing executable time, the network control section 704 sets the time to be indicated by the above Retry-After response to the time period from the time of sending of the Retry-After response to the multifunction peripheral 1 to the estimated repair time indicated by the maintenance notice or determines the above estimated repair period as the time period to be indicated by the Retry-After response.

Note that the network control section 704 and the network interface section 91 constitute an example of the communication control section described in What is claimed is.

The source and destination communication apparatuses are not limited to facsimile apparatuses shown above as the multifunction peripherals 1, 7 and may be other communication apparatuses, such as personal computers (may be a mobile device as for the source multifunction peripheral 1). Apparatuses that can be used as the source and destination communication apparatuses are those capable of sending and receiving data compatibly with the aforementioned SIP-based facsimile function. The description hereinafter will focus on, as an example, the case where the source and destination communication apparatuses are multifunction peripherals.

Figure 3:
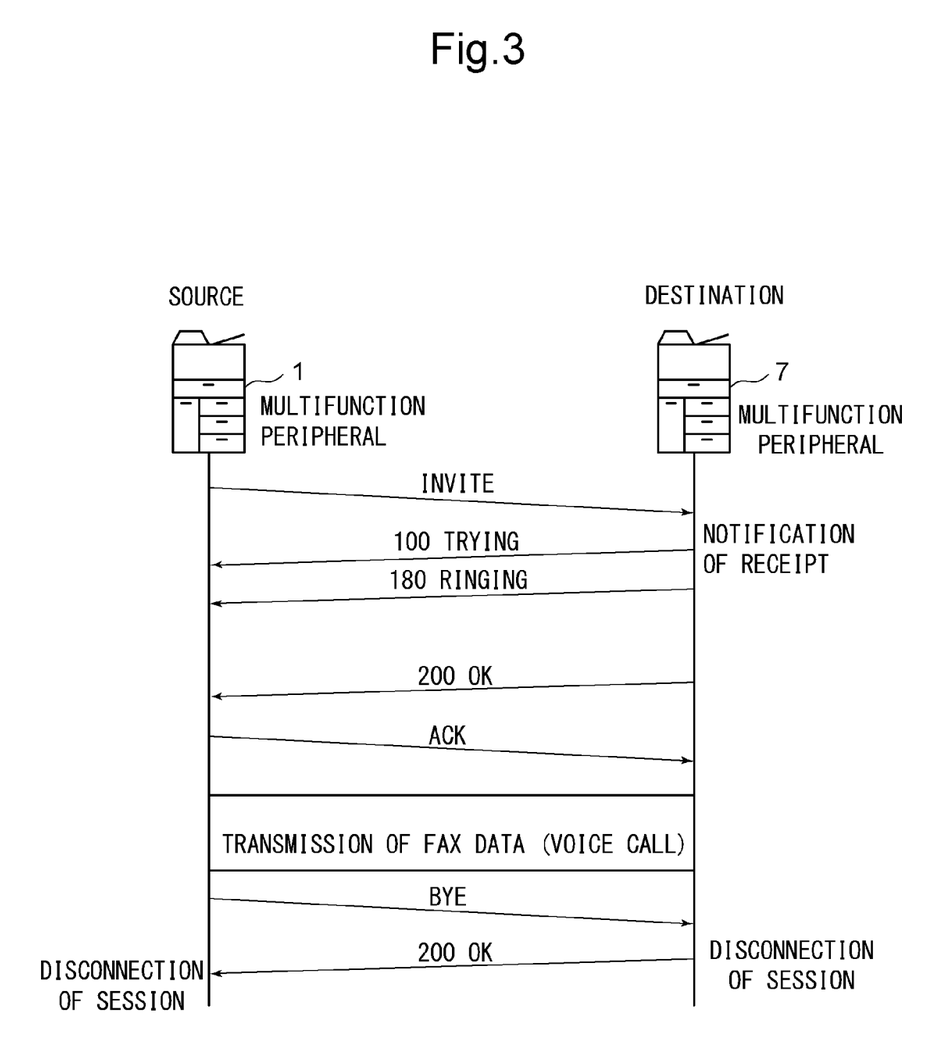
FIG. 3 is a chart showing a communication procedure during facsimile communication between a multifunction peripheral as a source and a multifunction peripheral as a destination.
Figure 5:
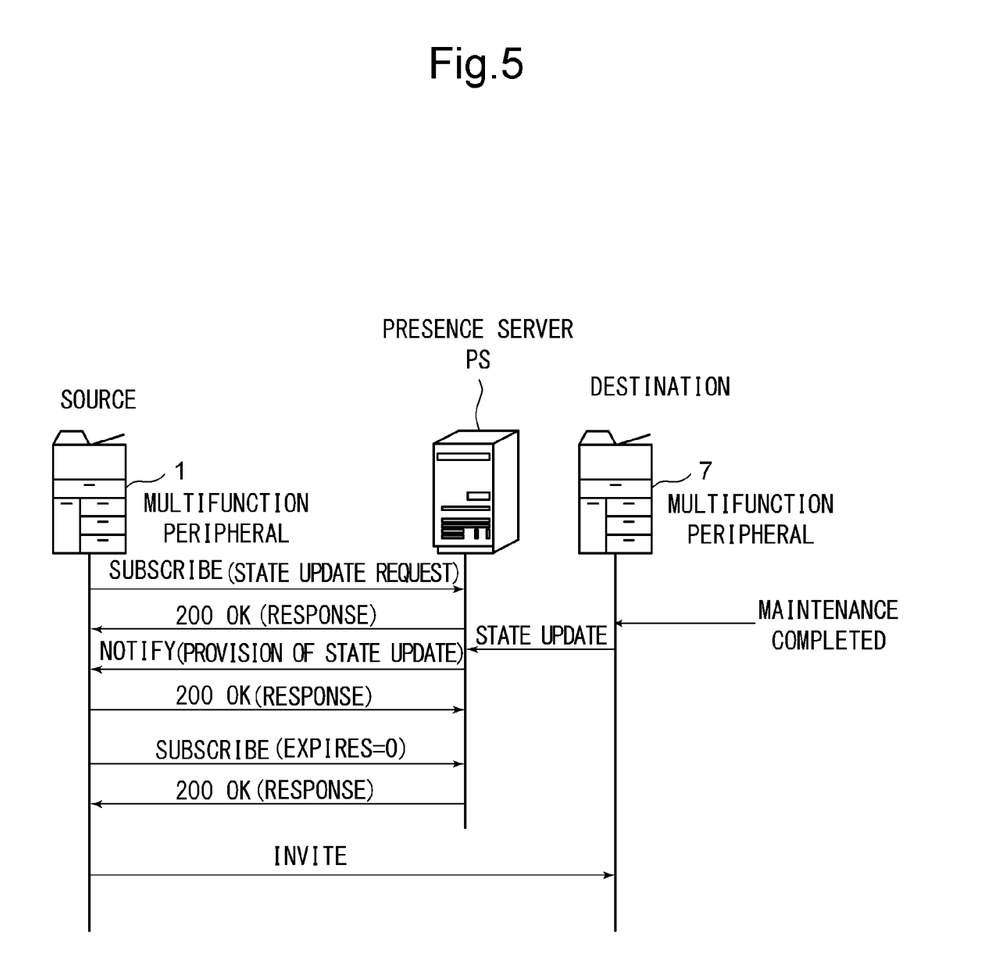
FIG. 5 is a chart showing a communication procedure in a communication configuration in which a SIP-based presence function is used.
Figure 6:
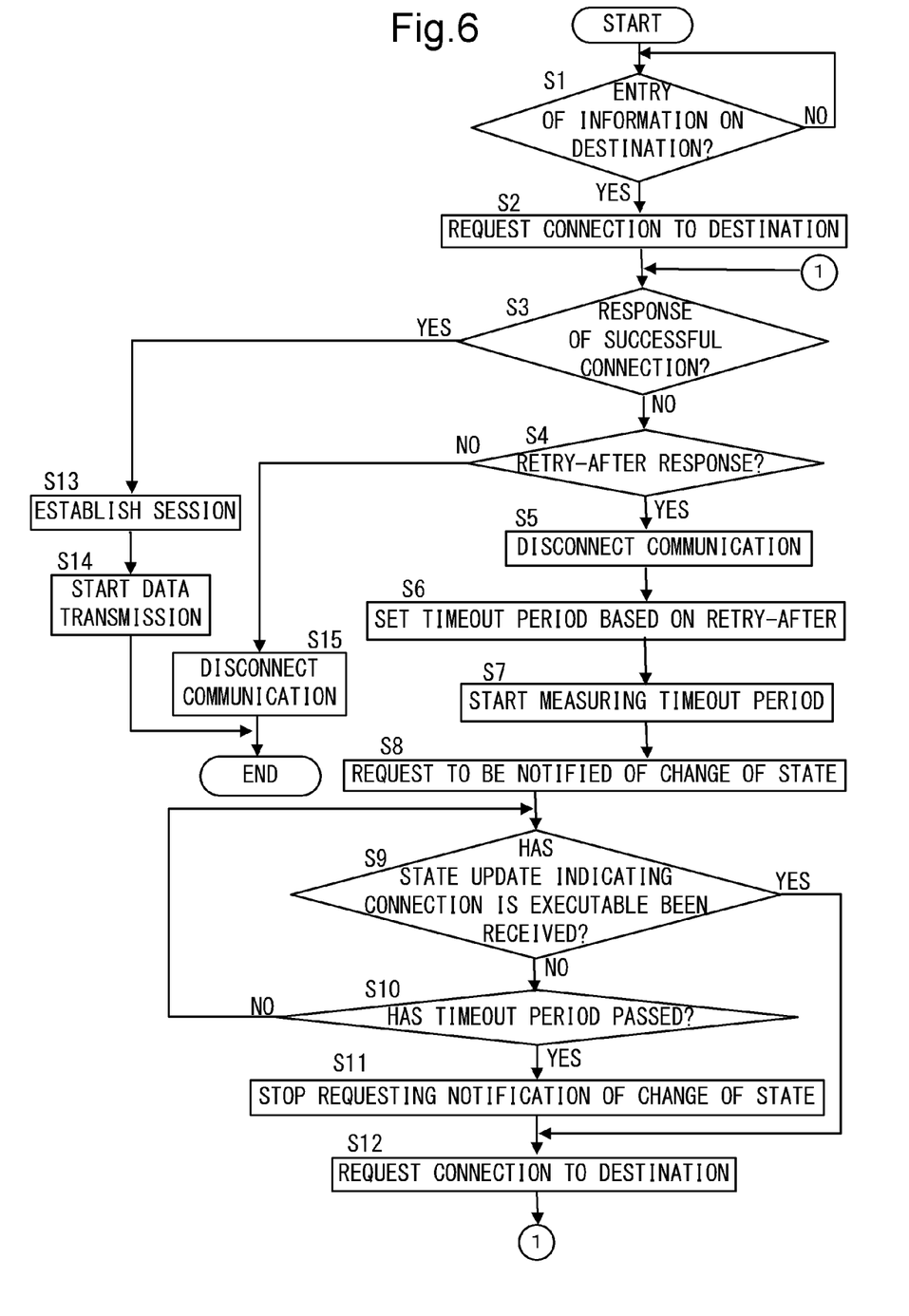
FIG. 6 is a flowchart showing SIP-based facsimile communication in the source multifunction peripheral.
Figure 7:
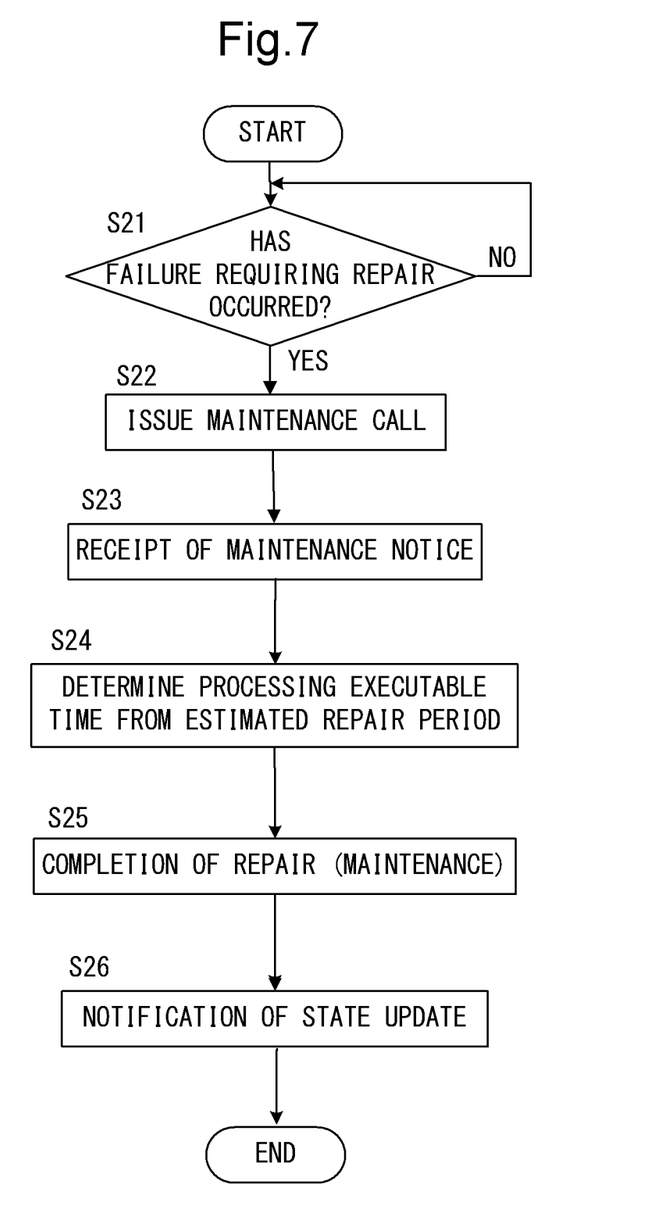
FIG. 7 is a flowchart showing a flow of processing performed during recovery from an error in the multifunction peripheral which is one embodiment of the communication apparatus according to the present disclosure.

Next, a description will be given of processing of communication between the multifunction peripheral 1 as a source communication apparatus and the multifunction peripheral 7 as a destination communication apparatus, taking as an example SIP-based facsimile communication. FIGS. 3 and 4 are charts showing different communication procedures during facsimile communication between the source multifunction peripheral 1 and the destination multifunction peripheral 7. FIG. 5 is a chart showing a communication procedure in a communication configuration in which a SIP-based presence function is used. FIG. 6 is a flowchart showing the SIP-based facsimile communication of the source multifunction peripheral 1. FIG. 7 is a flowchart showing a flow of processing performed during recovery form an error in the multifunction peripheral which is one embodiment of the communication apparatus according to the present disclosure. The SIP-based facsimile communication hereinafter described is performed, for example, over the LAN 5 and the Internet 6 but, for ease of explanation, no particular reference to these networks will be made. The SIP-based facsimile communication or transmission is hereinafter referred to simply as facsimile communication or transmission.

When an unshown operating section of the multifunction peripheral 1 receives, from an operator, entry of a command to perform facsimile transmission and communication destination information indicating a destination for the facsimile transmission based on the operations of the operator (YES in S1), the network control section 104 and the unshown network interface section (hereinafter collectively referred to simply as the network control section 104) of the multifunction peripheral 1 requests a connection to the destination (S2). For example, as shown in FIG. 3, the network control section 104 transmits to the destination multifunction peripheral 7 an INVITE signal requesting an SIP-based proxy connection (wherein the signal contains, for example, URI and SIP versions for indicating the destination for the connection request). This INVITE signal is first transmitted to the SIP server. When receiving the INVITE signal, the SIP server transmits a 100 Trying provisional response to the source multifunction peripheral 1. The SIP server transmits the received INVITE signal to the destination multifunction peripheral 7. The destination multifunction peripheral 7 having received the INVITE signal performs predetermined call processing and concurrently sends a 180 Ringing provisional response back to the source multifunction peripheral 1. This 180 Ringing response is transmitted via the SIP server to the source multifunction peripheral 1. The following requests and responses between the source multifunction peripheral 1 and the destination multifunction peripheral 7 are made via the SIP server but, for ease of explanation, no particular reference to the SIP server will be made.

Subsequently, the network control section 104 determines whether or not the signal having received as a response to the connection request indicates a successful connection (S3) and, if the received signal has content indicating a successful connection (YES in S3), establishes a connection with the destination (S13). For example, as shown in FIG. 3, when the network control section 104 receives a 200 OK response signal indicating the successful connection (the above received signal) from the destination multifunction peripheral 7 after transmitting the above connection request (INVITE) to the destination (YES in S3), the network control section 104 transmits, for example, an ACK request to the destination multifunction peripheral 7 to establish a connection (session) (S13).

After the establishment of the session, the network control section 104 of the multifunction peripheral 1 transmits to the destination multifunction peripheral 7, as transmission target data, data of a document image read by the unshown scanner section (S14).

When the source multifunction peripheral 1 completes the transmission of the above transmission target data, it transmits a BYE request (a session disconnection request) to the destination multifunction peripheral 7. The destination multifunction peripheral 7 responds to the request to send a 200 OK response back to the source multifunction peripheral 1, so that the session is closed to terminate the communication (see FIG. 3).

On the other hand, if in S3 the network control section 104 determines that the received response signal does not have content indicating a successful connection (NO in S3), then the network control section 104 determines whether or not the content of the received response signal is the aforementioned temporal inexecutability information (a response signal indicating that the multifunction peripheral 7 is temporarily unable to execute the connection processing required by the connection request and containing a processing executable time when the multifunction peripheral 7 becomes able to execute the connection processing) (S4). For example, the network control section 104 determines whether or not the received response signal is a Retry-After signal.

If the network control section 104 determines that the content of the received response signal is not the aforementioned temporal inexecutability information, such as a Retry-After signal, but indicates a state where the multifunction peripheral 7 is permanently unable to execute the connection processing meeting the connection request (NO in S4), the network control section 104 disconnects the communication for the connection request (S15). For example, when receiving a response signal indicating a communication error, such as 480 Temporarily Unavailable or 603 Decline, and indicating that connection is impossible for a relatively long period, the network control section 104 transmits an ACK request to the destination multifunction peripheral 7 to which it has transmitted the connection request. When the destination multifunction peripheral 7 responds to the ACK request to send a 200 OK response back to the source multifunction peripheral 1, the network control section 104 disconnects the session to terminate the communication.

If the network control section 104 determines that the content of the response signal is the aforementioned temporal inexecutability information, such as a Retry-After response (YES in S4), the network control section 104 disconnects the communication for the connection request (S5). As shown in FIG. 4, when the destination multifunction peripheral 7 outputs a Retry-After xxx (where xxx is a specified period represented in seconds) response signal and the network control section 104 receives it, the network control section 104 transmits an ACK request to the destination multifunction peripheral 7. When the destination multifunction peripheral 7 responds to the ACK request to transmit a 200 OK response and the network control section 104 receives the 200 OK response, the network control section 104 disconnects the session to terminate the communication.

If in this case the destination multifunction peripheral 7 causes an error requiring repair (YES in S21 in FIG. 7), the information acquiring communication control section 705 issues a maintenance call to the maintenance system MS (S22). The maintenance system MS sends back a maintenance notice as a response to the maintenance call. The information acquiring communication control section 705 receives the maintenance notice (S23) and determines a processing executable time of the multifunction peripheral 7 based on an estimated repair period (for example, an estimated time of arrival of a maintenance staff) indicated by the maintenance notice (S24). When the processing executable time of the multifunction peripheral 7 is determined, the network control section 704 sets the specified period xxx of the Retry-After xxx response as the processing executable time and then outputs to the source multifunction peripheral 1, as temporal inexecutability information, the Retry-After xxx response signal set for the processing executable time. Then, when the maintenance of the multifunction peripheral 7 is completed (S25), the network control section 704 notifies the presence server PS of a state update (S26).

Although in FIG. 4 a maintenance call is issued after a 180 Ringing provisional response is sent back to the source multifunction peripheral 1, the timing to issue a maintenance call is not limited to this. A maintenance call can be issued with any timing when the multifunction peripheral 7 causes an error.

Referring back to FIG. 6, the timeout management section 106 sets a timeout period based on information indicating a processing executable time, contained in the above temporal inexecutability information (S6). For example, when the temporal inexecutability information is Retry-After 3600, the timeout management section 106 sets 3600 seconds as the timeout period. As described previously, since this Retry-After 3600 response is set based on the aforementioned estimated repair period, the timeout period is set to a period based on the estimated repair period.

After setting the timeout period in the above manner, the timeout management section 106 starts measuring the set timeout period with an internal timer or the like (S7). Instead of the timeout management section 106, the network control section 104 may measure the timeout period with an internal timer or the like.

Then, the state update request section 105 requests to notify the source multifunction peripheral 1 of a state update about the destination multifunction peripheral 7 (S8). For example, the state update request section 105 requests the presence server PS to notify the source multifunction peripheral 1 of a state update indicating a change of state of the destination multifunction peripheral 7.

In this embodiment, for example, as shown in FIG. 5, in each destination multifunction peripheral 7 or the like under SIP-based control, the main control section 700 detects a change that occurs in the communication state of the multifunction peripheral 7. When the main control section 700 detects that the communication state has been updated, the network control section 704 transmits a state update to the presence server PS. The multifunction peripheral 7 or the like transmits to the presence server PS, as the state update, for example, a response signal indicating that connection has become possible, 486 Busy Here (the callee is busy), 603 Decline (the callee does not want to accept the call), 480 Temporarily Unavailable (the callee is now unavailable), 606

Not Acceptable (the callee wants to accept the call but the call is technically unacceptable), 182 Queued (requested processing has been queued), or 183 Session Progress (the session has progressed). The presence server PS stores, in the internal data storage section, various types of state updates received from each apparatus under the control thereof.

In the source multifunction peripheral 1, during the period from the start of measurement of the timeout period to the end of the timeout period, the network control section 104 determines whether or not the presence server PS has notified the multifunction peripheral 1 of a state update of the destination, indicating that the destination has become able to execute the connection processing (NO in S10 and then S9). For example, the network control section 104 acquires a state update from the presence server PS in the manner shown in FIG. 5. Specifically, the network control section 104 requests the presence server PS to transmit a state update every predetermined period, for example, every 10 seconds (SUBSCRIBE). In response to this, the presence server PS sends a successful 200 OK response back to the multifunction peripheral 1 having requested a state update (RESPONSE), retrieves a state update about the apparatus (the multifunction peripheral 7 in this embodiment) indicated by the request from the multifunction peripheral 1, and transmits the retrieved state update to the multifunction peripheral 1 (NOTIFY). The network control section 104 of the multifunction peripheral 1 having received the state update sends a successful 200 OK response back to the presence server PS (RESPONSE).

Here, if, during the period from the start of measurement of the timeout period to the end of the timeout period, for example, the repair of the multifunction peripheral 7 having issued the maintenance call is completed (maintenance completed) and the maintenance staff sets the completion of repair of the multifunction peripheral 7 to return the multifunction peripheral 7 into a normal operating state, the network control section 704 of the multifunction peripheral 7 transmits to the presence server PS a state update indicating that the multifunction peripheral 7 has become able to execute the above connection processing.

When the network control section 104 receives from the presence server PS the above state update, i.e., a state update indicating that the destination has become able to execute the above connection processing (NO in S10 and then YES in S9), the network control section 104 retransmits a connection request as in S2 to the destination even before the end of the waiting period indicated by the timeout period (S12). Thereafter, the process goes back to S3.

On the other hand, if the timeout management section 106 measures the end of the timeout period (YES in S10) while the network control section 104 has not received from the presence server PS a state update indicating that the destination multifunction peripheral 7 has become able to execute the above connection processing (NO in S9), the state update request section 105 stops requesting the notification of a state update on the destination multifunction peripheral 7 (S11). Specifically, as shown in FIG. 5, the state update request section 105 transmits to the presence server PS a request (SUBSCRIBE (Expires=0)) to stop notifying the source multifunction peripheral 1 of a state update every predetermined period. In response to this, the presence server PS transmits a 200 OK response signal to the multifunction peripheral 1. Thereafter, the network control section 104 retransmits the above connection request (INVITE, see FIG. 5) to the destination (S12). Thereafter, the process goes back to S3.

With the above configuration, even if the multifunction peripheral 7 (the destination communication apparatus) according to the one embodiment of the present disclosure causes an error requiring repair, it notifies, at the stage prior to the start of repair, the multifunction peripheral 1 serving as a data source of temporal inexecutability information based on the estimated repair period. Therefore, based on the notification, the source multifunction peripheral 1 can retransmit data being postponed from being transmitted, with an appropriate timing, i.e., at the time when processing, such as repair, necessary to eliminate the error is completed.

When the repair of the destination multifunction peripheral 7 at error is completed during the postponement of data retransmission for the waiting period, the network control section 104 of the source multifunction peripheral 1 receives from the destination multifunction peripheral 7 a state update indicating that the destination multifunction peripheral 7 has become able to execute connection processing. Therefore, the source multifunction peripheral 1 can establish a connection with the destination multifunction peripheral 7 as soon as the multifunction peripheral 7 recovers from the error.

When the timeout period set by the timeout management section 106 has passed, the state update request section 105 avoids the source multifunction peripheral 1 being notified of a state update on the destination multifunction peripheral 7 and the network control section 104 retransmits a connection request to the destination multifunction peripheral 7. Therefore, the notification of a state update not contributing to the determination of when to retransmit a connection request can be stopped to cut waste from communication. Furthermore, with the advent of the time when the destination multifunction peripheral 7 becomes able to connect with the source multifunction peripheral 1, the source multifunction peripheral 1 can surely establish a connection with the destination multifunction peripheral 7.

When the content of the response of the destination multifunction peripheral 7 to a connection request indicates that the multifunction peripheral 7 is permanently unable to execute connection processing and, therefore, if the destination multifunction peripheral 7 is less likely to recover to a state where it can connect with the source multifunction peripheral 1 even if the source multifunction peripheral 1 continues to wait, the state update request section 105 does not request to notify the source multifunction peripheral 1 of a state update on the destination multifunction peripheral 7 and the network control section 104 disconnects communication. Therefore, useless notification of state update and useless communication control not contributing to connection establishment can be dispensed with to further improve the efficiency during communication.

In the aforementioned technique A described in BACKGROUND, since the source facsimile apparatus can acquire waiting time information indicating the time when data transmission to the destination will be possible, it can be avoided that the destination uselessly retransmit transmission target data during the period in which the destination cannot receive the data. However, once the source facsimile apparatus starts controlling the postponement of data retransmission based on the waiting time information, the transmission target data is not transmitted to the destination until the end of the waiting time even if the destination facsimile apparatus changes to a state where the space of its data storage section becomes available to allow data to be received. Therefore, in the above technique A, the source facsimile apparatus must hold the transmission target data during the waiting period. This presents, for example, a problem in that when the amount of transmission target data is large or the memory capacity of the source facsimile apparatus is small, the source facsimile apparatus has a heavy load, which may impair efficient communication.

In the technique B described in BACKGROUND, a source facsimile apparatus does not retransmit a connection request to a destination facsimile apparatus unless receiving a state update from the destination facsimile apparatus. If in this case the destination facsimile apparatus causes a significant error requiring repair, the destination cannot notify the source facsimile apparatus of temporal inexecutability information. Therefore, the source facsimile apparatus cannot make a connection request to the destination again and thus may not be able to retransmit data to the destination.

In the above embodiment according to the present disclosure, as described above, even if a state update becomes unable to be issued from the destination communication apparatus while the source communication apparatus postpones data transmission to the destination communication apparatus, the source communication apparatus can retransmit data with an appropriate timing. Therefore, the problems with the above techniques A and B can be eliminated.

The present disclosure is not limited to the above embodiment and can be modified in various ways. For example, although in the above embodiment facsimile communication of the multifunction peripheral 1 with the destination is implemented by IP-based communication, for example, the facsimile function over the IP-based network using a SIP-based call control function, any protocol can be used as for communication after SIP-based connection with the destination. For example, the communication may be implemented by another network communication, such as the Internet facsimile function.

Although in the above embodiment the communication apparatus according to the present disclosure has been described as a multifunction peripheral or a facsimile apparatus, the communication apparatus according to the present disclosure is not limited to these communication apparatuses. For example, the communication apparatus according to the present disclosure may be a personal computer and the aforementioned communication processing described in the above embodiment may be made when the personal computer performs communication with a destination apparatus.

The configuration and processing shown in the above embodiment with reference to FIGS. 1 to 7 are merely illustrative of the present disclosure and not intended to limit the present disclosure to the above particular configuration and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A communication apparatus comprising:
a communication control section configured to respond to, based on SIP (Session Initiation Protocol), a request from a source communication apparatus; and
an information acquiring communication control section configured to control communication with an external maintenance system, wherein
the communication control section is further configured to, when the associated communication apparatus including the communication control section itself receives a connection request as the request from the source communication apparatus but is temporarily unable to execute connection processing required by the connection request, respond to the connection request to send back to the source communication apparatus temporal inexecutability information indicating that the associated communication apparatus is temporarily unable to execute the connection processing required by the connection request and containing a processing executable time when the associated communication apparatus becomes able to execute the connection processing, and
the information acquiring communication control section is further configured to, when the associated communication apparatus including the information acquiring communication control section itself causes an error requiring repair, issue to the maintenance system a maintenance call requesting the repair and determine the processing executable time based on an estimated repair period indicated by a maintenance notice which is a response to the maintenance call.

2. The communication apparatus according to claim 1, wherein the communication control section allows the processing executable time to be contained in a Retry-After response signal serving as the temporal inexecutability information.

3. The communication apparatus according to claim 1, wherein when the communication control section detects that the repair of the associated communication apparatus including the communication control section itself is completed, the communication control section notifies a presence server of a state update of the associated communication apparatus, the presence server being configured to store a state update of each of communication apparatuses connected thereto.

4. The communication apparatus according to claim 3, wherein the communication control section is configured to detect, based on a setting made by a maintenance staff and concerning the completion of the repair, that the repair of the associated communication apparatus including the communication control section itself is completed.

5. The communication apparatus according to claim 1, wherein the communication control section is further configured to, when the associated communication apparatus including the communication control section itself receives a connection request as the request from the source communication apparatus but is unable for a long period to execute connection processing required by the connection request, respond to the connection request to send back to the source communication apparatus a response signal indicating that the associated communication apparatus is unable for a long period to execute the connection processing required by the connection request.

6. A communication method comprising:
a replying step of, when an associated communication apparatus receives a connection request as a request from a source communication apparatus but is temporarily unable to execute connection processing required by the connection request, responding to the connection request based on SIP (Session Initiation Protocol) to send back to the source communication apparatus temporal inexecutability information indicating that the associated communication apparatus is temporarily unable to execute the connection processing required by the connection request and containing a processing executable time when the associated communication apparatus becomes able to execute the connection processing; and
a processing executable time determining step of, when the associated communication apparatus causes an error requiring repair, issuing to an external maintenance system a maintenance call requesting the repair and then determining the processing executable time based on an estimated repair period indicated by a maintenance notice which is a response to the maintenance call.

\* \* \* \* \*